United States Patent Office 2,807,651
Patented Sept. 24, 1957

2,807,651

METHOD OF PREPARING GLYCOLS AND MONOETHERS OF GLYCOLS

Edgar C. Britton and Arthur R. Sexton, Midland, Mich., assignors to The Dow Chemical Company, Midland, Mich., a corporation of Delaware No Drawing. Application March 23, 1956,
Serial No. 573,342

20 Claims. (Cl. 260—611)

This invention concerns the hydration and the alcoholation of olefin or alkylene oxides and of halogenated olefin oxides. More particularly, it concerns an improvement in the process for carrying out such hydration and alcoholation by the use of a highly effective and novel catalyst. As used herein hydration designates the addition by chemical bond of water, and alcoholation designates such addition of a monohydric acyclic, alicyclic, or aromatic alcohol to a chemical compound.

The hydration of an alkylene oxide, including the halogenated alkylene oxides such as 3-chloro-1,2-epoxypropane or epichlorohydrin, produces the glycol corresponding to the oxide, whereas alcoholation of such compound produces the corresponding monoether of a glycol. Although the invention is directed principally toward the production of the monoether of a monoglycol, under selected conditions some ethers of diglycols and to a lesser extent ethers of higher polyglycols may be produced as well. The higher ethers are formed in considerable amounts only when there is a large excess of the oxide over the alcohol. However, the usual starting material to produce the ether of a diglycol is the appropriate monoglycol, e. g. ethoxyethanol to produce ethoxyethoxyethanol.

Glycols and glycol ethers are of such commercial significance that they are classed among the heavy chemicals. The glycols are widely used as anti-freeze industrial coolants; as a component in hydraulic fluids; as plasticizing, wetting and hygroscopic agents; as solvents in a wide number of chemical applications; and as starting materials in the preparation of glycol derivatives. Propylene glycol is widely used as a preservative in foods and as a plasticizer in pharmaceuticals and cosmetics.

Glycol ethers are valuable as solvents in plasticizers and as industrial solvents and chemical intermediates. They are used in leather and paper protective-coating operations; in the manufacture of lacquers, enamels and varnishes; as coupling agents in dry-cleaning soaps and insecticide mixtures. Certain glycol monoethers are effectively used in dye stuffs and inks, in stain-removing compositions and in lubricants. Certain glycol ethers are copolymerized with vinyl monomers to form moldable resins. It can readily be appreciated that an improved method of preparing glycols and glycol ethers has very high value, and that a method of preparation which increases the percent yield to an appreciable extent would represent substantial potential savings in cost of production.

Heretofore, in the preparation of glycols, it has been necessary to carry on the reaction between the alkylene oxide and water at a high temperature, e. g. 120° to 150° C. In the preparation of the glycol ethers, temperatures as high as 200° C. have been suggested. High pressures have heretofore been required, e. g. 12 to 14 atmospheres, for the preparation of glycol ethers. An undesirably large ratio of water or alcohol to the alkylene oxide has been found necessary, 40 to 50 moles of water or alcohol to one mole of the oxide being common.

It is known to catalyze the reaction of an alkylene oxide and water or an organic hydroxy compound, by certain acids (particularly sulfuric acid), by alkali metal bases, alcoholates, oxides of titanium, tungsten, and thorium, by certain metal salts such as $NiSO_4$, acid-forming salts such as $BF_3$, and the chlorides of Zn, Sn, and Fe, by certain hydrosilicates and acidified hydrosilicates as aluminum hydrosilicate, lower alkyl tertiary amines (such as trimethyl, triethyl and triamyl), and certain organic salts as diethyl sulfate. Such known catalysts have been found helpful in one way or another, but have been unsatisfactory in a number of respects.

We have discovered a superior catalyst which lends itself well to laboratory and industrial practice, is readily obtainable and relatively inexpensive, can be used effectively in aqueous and non-aqueous mediums, and is easily removed by vaporization from the resulting glycol or glycol ether. We have found sulfur dioxide to be such a catalyst.

Sulfur dioxide possesses many advantages over known catalysts. It provides a better percent yield than do known catalysts when using the same reactants under comparable conditions. It catalyzes the reaction at atmospheric pressure, or, when the reaction is conducted under increased pressure, it speeds up the reaction, decreasing the time otherwise required which results in definite economic savings in time and equipment. Sulfur dioxide catalyzes the reaction in general at pronouncedly lower temperatures than do known catalysts. It lends itself well to use in a glass-lined equipment, whereas alkaline catalysts cannot be used in such equipment; on the other hand, it lends itself well to use in stainless steel equipment, since it is less corrosive than sulfuric acid as a catalyst. Sulfur dioxide may be readily removed from the reactant mixture when its removal is desired; the ease with which it may be volatilized is an especially convenient and facile condition associated with its use as a catalyst in converting alkylene oxides or epihalohydrins to glycols or to glycol ethers. Sulfur dioxide is so very effective in catalyzing this reaction that the large excess of water required for hydration of the alkylene oxide to the glycol or of alcohol for alcoholation to the glycol ether conventionally required is greatly reduced, being only about one-fourth as great when sulfur dioxide is used. This attribute very clearly represents a savings in handling and pumping, and in salvaging of unused reactant which is considerable where large excesses of water or alcohol are required.

When sulfur dioxide, in catalytic amounts, in accordance with the present invention, is introduced in the water or monohydric alcohol to which an alkylene oxide has been admixed or, to which it is subsequently admixed, high yields of the corresponding glycol, or of glycol monoethers are obtained. When the reaction is that of hydration, and an unsubstituted lower alkylene oxide is used, these high yields are obtained at no higher temperatures than 30° C.; only when the halo-substituted oxide, such as epichlorohydrin or epibromohydrin, is used, is a temperature of 50° to 60° C. recommended. When the reaction is that of alcoholation, a temperature occasionally as high as 100° C. is used for acyclic alcohols; when the alcohol is a cycloalkanol, the exceptional temperature of 150° C. is recommended for optimum results.

The reaction catalyzed by sulfur dioxide goes smoothly and satisfactorily at atmospheric pressure in contrast to the reaction catalyzed by most other catalysts when substantially higher pressures are required. However, the use of sulfur dioxide does not preclude the advantages of higher pressure, but on the contrary, is greatly aided by even such slight increases in pressure as 5–10 lbs. When such slight increases in pressure are employed in the sulfur dioxide catalyzed preparation of glycols and monoethers of glycols, the contact time between the alkylene oxide and hydroxy compound is sufficiently intensified to reduce the reaction time from a few hours to 5–10 minutes. Employing small pressures over atmospheric pressure in the practice of the invention makes it particularly suitable for continuous operation. Furthermore, no catalyst has hitherto been found to bring about effectively a satisfactory yield of a monoether of a glycol by reacting a cycloalkenyl such as cyclohexanol with an alkyl oxide. We have found cycloalkanols to be quite satisfactory in such reaction when catalyzed by sulfur dioxide.

A particularly valuable advantage of using the sulfur dioxide catalyst is that no more than 10 to 12 moles of the water or the alcohol per mole of the alkylene oxide are required to prepare a good yield of monoglycols or monoethers as contrasted to the 40 to 50 molar ratio of the water or alcohol per mole of the oxide usually found necessary.

There is no critical maximum amount of sulfur dioxide required in practicing the invention; it can be used in as large an amount as desired. However, only a very small amount is necessary to fully realize the numerous advantages that devolve from its use. Although actual practice has shown a range of 0.1 to 5 percent, based on the weight of the reacting water or alcohol, to be quite satisfactory, it has also shown that excellent catalytic action results from an amount approaching a value as low as 0.01 percent by weight.

The term, olefin or alkylene oxides, as used in the present invention, refers to epoxy alkanes, i. e. alkanes in which an oxygen atom completes a three-membered ring with two adjacent carbon atoms of an alkane chain by forming a bridge therebetween. The invention is directed toward those reactions in which the oxygen bridge is the only chemically reactive substituent of the alkylene oxide. Olefin oxides which are encompassed by the invention are the oxides of ethylene, propylene, 1,2-butylene, 2,3-butylene, isobutylene, styrene (1,2-epoxyethylbenzene), 1-bromopropylene (epibromohydrin) and 1-chloropropylene (epichlorohydrin).

The alcohols encompassed by the invention are primary and secondary acyclic alcohols up to at least $C_{20}$; all alicyclic alcohols, of sufficient stability for storage and use, but principally cyclopentanol and cyclohexanol; all primary aromatic alcohols, examples of which are benzyl, beta-phenethyl, gamma-phenpropyl and delta-phenbutyl; and aromatic secondary alcohols wherein the hydroxyl group is attached to a carbon atom other than the alpha carbon atom such as beta-phenpropyl and beta- and gamma-phenbutyl alcohols; and phenoxy alcohols, examples of which are phenoxyethyl and phenoxypropyl alcohols. The alcohols which best serve the practical purposes of the invention are those alcohols in which the length of the hydrocarbon chain is not over about 18 methylene groups or the carbocyclic rings do not exceed 1 so that the hydroxyl radical will not be prevented from making sufficiently frequent contact with the epoxy groups to cause the reaction to proceed to a satisfactory state of completion.

In the preparation of the glycol from the appropriate olefin oxide and water, the molar ratio of 1 of the olefin oxide to between 5–40 of water is generally used with a preferred range of between 8 to 15 of the water to 1 of the oxide. In the preparation of the glycol nonoethers, a molar ratio of 1 olefin oxide to between 3–20 of the alcohol has been found good, the preferred range, however, being between 4 to 8 of the alcohol to 1 of the oxide.

The invention is directed primarily to an improved method of making the glycols and the monoethers of monoglycols. However, by using a monoether of a glycol as a starting ingredient, monoethers of polyglycols may be obtained. For example, when an olefin oxide such as ethylene oxide is mixed with a glycol monoether, such as 2-ethoxyethanol, in the presence of sulfur dioxide as a catalyst, a good yield of the monoether of the diglycol, in this instance the 2-(2-ethoxyethoxy)-ethanol, is obtained.

In carrying out the invention, the water, if the glycol is to be prepared, or the alcohol, if the monoether is to be prepared, is placed together with a catalytic amount of sulfur dioxide in a suitable container which is preferably equipped with a stirring means, a reflux condenser, and means for admitting the alkylene oxide or halogenated propylene oxide. It is also preferred that the container be provided with means for reading the temperature and pH during the reaction. The alkylene oxide is then introduced slowly, either as a gas or liquid. It is convenient to place the olefin oxide source on a balance so the amount used can be ascertained at any time. When water is being reacted in the preparation of the glycol, the temperature may be room temperature or slightly above. An ice bath may be used if desired to prevent heatnig due to the heat of reaction. When alcohol is being reacted in the preparation of a monoether of a glycol, heat can be advantageously applied; a reaction temperature between 50° and 150° C. may be maintained until the reaction has been substantially completed as shown by the depletion of the olefin oxide. If desired the mixture may thereafter be neutralized with a suitable base.

The mixture is thereafter distilled during which monoglycols or the monoethers of the monoglycol can be recovered in substantially pure form.

The practice of the invention will be made clear in the following examples, which are set out for illustrative purposes only and are not to be constructed as defining the limitations of the invention.

PREPARATION OF GLYCOLS

*Example 1*

The apparatus consisting of a 12-liter 6-neck flask, equipped with a glass stirrer, Dry Ice reflux head, thermometer, pH electrodes, and sparger for adding the oxide below the surface of the liquid was cooled in an ice bath. To the flask were added 6000 g. of water and 6 g. of $SO_2$. The pH dropped to 2.2 and remained here throughout the run. Thirty-one moles (1800 g.) of propylene oxide were then added dropwise over a period of 4¾ hours while the temperature was maintained at 27–32° C. by means of the ice bath. No oxide refluxed in the Dry Ice head during the addition. After adding all the oxide the mixture was heated to 75° C., but no oxide refluxed in the head. The mixture was then neutralized to a pH of 7 with $Ca(OH)_2$, was filtered by suction, and was distilled on a 1¼″ x 4′ column packed with ¼″ stainless steel saddles. The distillate, boiling higher than water, consisted of 91 percent, 2054 g. (27 moles) of propylene glycol (B. P. 84–86/10 mm.); 7.9 percent, 178 g. (1.33 moles) of dipropylene glycol (B. P. 114–116/10 mm.); and 1.1 percent, 23 g., of polypropylene glycol other than the dipropylene glycol.

*Example 2*

A quantity of 10 moles of normal butylene oxide (92 percent 1,2-isomer and 8 percent 2,3-isomer) was added to 111 moles of water, containing 0.1 percent $SO_2$, at 18–30° C., over a period of 4¾ hours. The apparatus and procedure were similar to those of Example 1. The material, boiling above water, assayed by distillation 94.5 percent monobutylene glycol and 5.5 percent diglycol and higher boiling polyglycols.

*Example 3*

A quantity of 10 moles of isobutylene oxide was added to 111 moles of water, containing 0.1 percent $SO_2$, at 24–30° C. over a period of 3 hours using similar apparatus and method as in Example 1. The material, boiling above water, assayed by distillation to be 95.5 percent isobutylene glycol and 4.5 percent diglycol and higher boiling polyglycols.

Example 4

A quantity of 10 moles of styrene oxide was added to 111 moles of water, containing 0.1 percent $SO_2$, over a period of 6 hours at 18–26° C. following substantially the procedure set out in Example 1. The material, boiling above water assayed by distillation to be 80 percent monostyrene glycol and 20 percent diglycol and higher boiling polyglycols.

Example 5

A quantity of 10 moles epichlorohydrin was added to 111 moles of water, containing 0.1 percent $SO_2$, over a 3.5 hour period at 21–75° C. following substantially the procedure set out in Example 1. The product, boiling above water, assayed by distillation 92.5 percent glycerol monochlorohydrin and 7.5 percent higher boiling polychlorohydrins.

Example 6

A quantity of 10.6 moles of ethylene oxide was added to 110 moles of water containing 0.1% of $SO_2$ based on the water at 25–35° C. over a period of 4¾ hours following substantially the procedure set out in Example 1. On distillation there was obtained a total of 619 g. of glycols which was shown to consist of 87 percent monoethylene glycol and 13 percent polyethylene glycols. The data of Examples 1–6 are set out in Table I below:

Example 8

A quantity of 5.15 moles of ethylene oxide was added to 22 moles of the monoether of ethylene glycol, viz. 2-ethoxyethanol, containing 0.4 percent $SO_2$ at 75–80° C. The addition was made over a 2 hour period. The mixture was thereafter heated 8 hours. The monoether of diethylene glycol, viz. 2-(2-ethoxyethoxy)ethanol consisting of 80 percent of the glycol ethers formed; 20 percent was higher boiling polyethers of ethylene glycol.

Example 9

A quantity of 19.2 moles of ethylene oxide was added to 115 moles of methanol, containing 0.4 percent $SO_2$, over a period of 1.75 hours at 63–67° C. The mixture was thereafter heated 4 hours at this temperature. The ethers were separated therefrom by fractional distillation. The ethers consisted of 87 percent 2-methoxyethanol and 13 percent higher boiling glycol ethers.

Example 10

A quantity of 5.75 moles of propylene oxide was added to 34.5 moles of sec-butyl alcohol, containing 0.4 percent $SO_2$, over a period of 2 hours at 95–100° C. The mixture was thereafter heated 5 hours at this temperature. Upon distillation, the ethers assayed by distillation to be 86 percent monopropylene glycol sec-butyl ether and 14 percent higher boiling glycol ethers.

Example 11

A quantity of 6.7 moles of propylene oxide was added to 40.2 moles of cyclohexanol, containing 0.4 percent $SO_2$, at 150° C. over a ½ hour period and heating was continued 3 hours. The ethers were formed and separated by fractional distillation. The ethers consisted of 96 percent monopropylene glycol cyclohexyl ether and 4 percent higher boiling glycol ethers.

TABLE I.—PREPARATION OF GLYCOLS USING $SO_2$ AS CATALYST AT ATMOSPHERIC PRESSURE

| Example | Reactants | | | | | Temp., ° C. | Products | | |
|---|---|---|---|---|---|---|---|---|---|
| | Oxide | Moles oxide | Moles $H_2O$ | Mole ratio $H_2O$/one oxide | Percent $SO_2$ based on $H_2O$ | | Total percent yield glycol recovered [1] | Wt. percent mono [2] | Wt. percent poly [2] |
| 1 | Propylene | 31 | 332 | 10.7 | 0.1 | 27–32 | 96 | 91 | 9.0 |
| 2 | Butylene | 10 | 111 | 11.1 | 0.1 | 18–30 | 97.5 | 94.5 | 5.5 |
| 3 | Isobutylene | 10 | 111 | 11.1 | 0.1 | 24–30 | 92.5 | 95.5 | 4.5 |
| 4 | Styrene | 10 | 111 | 11.1 | 0.1 | 18–26 | 97.0 | 80.0 | 20 |
| 5 | Epichlorohydrin | 10 | 111 | 11.1 | 0.1 | 21–75 | 77.5 | 92.5 | 7.5 |
| 6 | Ethylene | 10.6 | 110 | 10.3 | 0.1 | 25–35 | 95.0 | 87 | 13 |

[1] Based on oxide consumed.
[2] Based on glycol recovered.

PREPARATION OF GLYCOL ETHERS

The procedure followed and the apparatus used in the examples set out below were substantially the same as those used in the examples above except a 5-liter flask was used instead of a 12-liter flask.

Example 7

A quantity of 3000 g. (93.5 moles) of methanol and 3 g. of $SO_2$ was added to the flask. The pH dropped to 2.1 and remained at this point throughout the run. Nine hundred g. (15.5 moles) of propylene oxide were then added dropwise over a 4¼ hours period at 44–50° C., without any oxide refluxing in the Dry Ice head. The mixture was then distilled as in the above examples. This gave 538 g. of 1-methoxy-2-propanol, 545 g. 2-methoxy-1-propanol or 1083 g. of the monoalkyl ether which was 90 percent of the theoretical yield. The residue of 120 g. which was 10 percent of the yield was higher boiling polyglycol ethers. The unreacted methanol, was distilled off for recycling.

Example 12

A quantity of 26.2 moles of propylene oxide was added to 80.5 moles of ethanol, containing 0.5 percent $SO_2$, at 75–100° C. over a period of 2 hours; the heating was continued 4 additional hours. The ethers consisted of 83.5 percent of the two isomeric monoethyl ethers of propylene glycol, 7.0 percent monoethyl ether of dipropylene glycol; and 9.5 percent higher boiling glycol ethers.

Example 13

A quantity of 52 moles of isopropyl alcohol containing 0.6 percent $SO_2$, was reacted with 8.65 moles propylene oxide at 100° C. The reaction mixture was heated at this temperature for a total of 20 hours. The ethers consisted of 98 percent monoisopropyl ethers of propylene glycol and 2 percent higher boiling glycol ethers.

The data of Examples 7 to 13 are set out in Table II below:

TABLE II.—REACTION ALKENE OXIDES WITH ALIPHATIC ALCOHOLS USING SO₂ AS CATALYST TO GIVE GLYCOL ETHERS

| Example | Reactants | | | | | | Temp., °C. | Products | | | |
|---|---|---|---|---|---|---|---|---|---|---|---|
| | Alcohol | Oxide | Moles alc. | Moles oxide | Mole ratio alc./one oxide | Wt. percent SO₂ based on alcohol | | Wt. percent mono | Wt. percent Di | Wt. percent of higher poly | Total percent yield based on oxide consumed |
| 7 | Methanol | Propylene | 93.5 | 15.5 | 6.0 | 0.1 | 20–50 | 90 | | 10.0 | 87 |
| 8 | 2-ethoxy-ethanol | Ethylene | 22 | 5.15 | 4.27 | 0.4 | 75–80 | | 80 | 20.0 | [1] 69.5 |
| 9 | Methanol | do | 115 | 19.2 | 6.0 | 0.4 | 63–67 | 87 | | 13.0 | [1] 61.5 |
| 10 | sec-Butanol | Propylene | 34.5 | 5.75 | 6.0 | 0.4 | 95–100 | 86 | | 14.0 | 79 |
| 11 | Cyclohexanol | do | 40.2 | 6.7 | 6.0 | 0.5 | 150 | 96 | | 4.0 | 71 |
| 12 | Ethanol | do | 80.5 | 26.2 | 3.08 | 0.5 | 75–100 | 83.5 | | 16.5 | 74.5 |
| 13 | Isopropyl | do | 52 | 8.65 | 6 | 0.6 | 100 | 98 | | 2 | 57.7 |

[1] Some oxide lost due to leak.

For purposes of comparison of sulfur dioxide as a catalyst with widely used known catalysts, Examples 14 and 15 were run. A tabulation of these examples is made in Table III.

*Example 14*

Using glass apparatus similar to that employed in the foregoing examples, 55 moles of water containing 0.1 percent sulfuric acid, based upon the weight of water was added slowly to ethylene oxide at a temperature of 28° to 34° C. for four and one-half hours. The percent monoethylene glycol recovered was 83 percent based upon the oxide consumed.

*Example 15*

Using metal apparatus which was otherwise similar to the apparatus used in the foregoing examples, 166 moles of water, containing 0.67 percent sodium hydroxide, were reacted with 15.5 moles of propylene oxide at a temperature of 125° C. to 130° C. for four and one-half hours.

TABLE III.—ALKYLENE OXIDES AND WATER REACTION CATALYZED BY KNOWN CATALYSTS

| Example | Reactants | | | | Catalyst used, in percent based on H₂O | Temp., °C. | Products | | |
|---|---|---|---|---|---|---|---|---|---|
| | Oxide | Moles oxide | Moles H₂O | Mole ratio H₂O/one oxide | | | Percent yield total glycol recovered based on oxide consumed | Wt. mono | Wt. poly |
| 14 | Ethylene | 5.9 | 55 | 9.35 | Sulfuric acid, 0.10 | 28–34 | 93 | 83 | 17 |
| 15 | Propylene | 15.5 | 166 | 10.7 | Sodium hydroxide, 0.67 | 125–150 | 94 | 70 | 30 |

By reference to the data in Table III, the superiority of sulfur dioxide is readily seen. When sulfuric acid was the catalyst used, an increase in yield of monoethylene glycol obtained was 5 percent less than that obtained when sulfur dioxide was the catalyst, as shown in Example 6. An increase in yield of 5 percent in a large volume product such as a monoglycol, without additional outlay or operating costs, is of economic importance. When sodium hydroxide was the catalyst used to make monopropylene glycol, an elevated temperature was required which was about 100° C. higher than that needed when sulfur dioxide was used. Even at this elevated temperature, the yield based on the weight of the oxide consumed, was lower in the sodium hydroxide catalyzed reaction.

The increase in yield, together with the other advantages hereinbefore stated, makes sulfur dioxide an excellent catalyst for the production of glycols and monoethers of glycols.

Having thus described our invention, what we claim and desire to protect by Letters Patent is:

1. The method of making glycols and monoethers of glycols by the reaction of an oxide selected from the class consisting of the oxides of ethylene, propylene, 1,2-butylene, 2,3-butylene, isobutylene, 1,2-epoxy-ethylbenzene, 1-bromopropylene, and 1-chloropropylene with an hydroxy compound selected from the class consisting of water, primary and secondary acylic alcohols, alicyclic alcohols, primary aromatic alcohols, secondary aromatic alcohols in which the hydroxyl group it attached to a carbon atom other than the alpha carbon atom, and phenoxy alcohols, said reaction being catalyzed by sulfur dioxide.

2. The method of claim 1 wherein the weight of sulfur dioxide based upon the weight of the hydroxy compound is between 0.01 and 5 percent.

3. The method of claim 1 wherein the alkylene oxide is ethylene oxide.

4. The method of claim 1 wherein the olefin oxide is propylene oxide.

5. The method of claim 1 wherein the olefin oxide is isobutylene oxide.

6. The method of claim 1 wherein the olefin oxide is butylene oxide.

7. The method of claim 1 wherein the halogenated olefin oxide is epichlorohydrin.

8. The method of claim 1 wherein the hydroxy compound is water.

9. The method of claim 1 wherein the hydroxy compound is an acylic alcohol.

10. The method of claim 9 wherein the acyclic alcohol is a primary alcohol.

11. The method of claim 9 wherein the acyclic alcohol is a secondary alcohol.

12. The method of claim 10 wherein the primary acyclic alcohol is methanol.

13. The method of claim 11 wherein the secondary alcohol is isopropanol.

14. The method of claim 1 wherein the hydroxy compound is a 2-alkoxy alcohol.

15. The method of claim 14 wherein the 2-alkoxy alcohol is 2-ethoxy-ethanol.

16. The method of claim 1 wherein the alicylic alcohol is cyclohexanol.

17. The method of claim 1 wherein the sulfur dioxide is subsequently removed by volatilization.

18. The method of claim 1 wherein said oxide is gradually admixed with said hydroxy compound and sulfur dioxide over a period of from 1 to 5 hours and the resulting admixture is thereafter maintained at a reaction temperature of 20 to 200° C. for from 0.5 to 20 hours.

19. The method of claim 1 wherein the reaction is carried out at a pressure between atmospheric pressure and about 20 pounds per square inch gauge pressure.

20. The method of making glycols and monoethers of glycols in a continuous process by reacting an oxide selected from the oxides of ethylene, propylene, 1,2-butylene, 2,3-butylene, isobutylene, 1,2-epoxy-ethylbenzene, 1-bromopropylene, and 1-chloropropylene with an hydroxy compound selected from the class consisting of water, primary and secondary acyclic alcohols, alicyclic alcohols, primary aromatic alcohols, secondary aromatic alcohols in which the hydroxyl group is attached to a carbon atom other than the alpha carbon atom, and phenoxy alcohols comprising the steps of: continuously admixing said oxide to said hydroxy compound in the presence of from 0.01 to 5.0 percent sulfur dioxide, in a molar ratio of between 3 to 20 moles of said hydroxy compound to 1 mole of the oxide, to form a reaction mixture, heating said mixture at a reaction temperature between 20° and 200° C. until the reaction is substantially complete, volatilizing off the excess sulfur dioxide, and thereafter separating said glycols and monoethers of glycols in substantially pure form from said reaction mixture.

References Cited in the file of this patent

Bronsted et al.: Jour. Amer. Chem. Soc., vol. 51, pgs. 428, 429, 457–467 (1929).

Kharasch et al.: Jour. Organic Chem., pgs. 189–193 (1943).

Chitwood et al.: Jour. Amer. Chem. Soc., vol. 68, pgs. 680–683 (1946).

Swern et al.: Jour. Amer. Chem. Soc., vol. 71, pgs. 1152–1156 (1949).

McClellan: Industrial and Engin. Chem., vol. 42, pgs. 2402–2407 (1950).

Moeller: Inorganic Chemistry, 1952, pgs. 527, 536, 537.

Ephraim: Inorganic Chemistry, 6th edit. rev., 1954, pgs. 572–573.